US012692793B2

(12) United States Patent
Kray et al.

(10) Patent No.: US 12,692,793 B2
(45) Date of Patent: Jul. 28, 2026

(54) TURBINE ENGINE WITH COMPLIANT AXIAL RETAINER

(71) Applicant: General Electric Company, Evendale, OH (US)

(72) Inventors: Nicholas Joseph Kray, Mason, OH (US); Elzbieta Kryj-Kos, Evendale, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/283,850

(22) Filed: Jul. 29, 2025

(65) Prior Publication Data

US 2025/0354494 A1 Nov. 20, 2025

Related U.S. Application Data

(63) Continuation of application No. 18/480,169, filed on Oct. 3, 2023, now abandoned.

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2300/43* (2013.01); *F05D 2300/50* (2013.01)

(58) Field of Classification Search
CPC ...... F01D 5/3007; F01D 5/3015; F01D 5/326; F04D 29/322; F04D 29/329; F04D 29/34
See application file for complete search history.

(56) References Cited

U.S. PATENT DOCUMENTS

| | | | | |
|---|---|---|---|---|
| 2,660,252 | A | 11/1953 | Doussain | |
| 5,259,728 | A * | 11/1993 | Szpunar | F04D 29/322 416/221 |
| 5,282,720 | A * | 2/1994 | Szpunar | F01D 5/323 416/248 |
| 5,522,702 | A | 6/1996 | Kemsley | |
| 6,905,311 | B2 | 6/2005 | Leathart | |
| 8,105,042 | B2 | 1/2012 | Parkin | |
| 8,186,961 | B2 | 5/2012 | Stone | |
| 8,192,167 | B2 | 6/2012 | Helmis | |
| 8,419,374 | B2 | 4/2013 | Huth | |
| 8,573,947 | B2 | 11/2013 | Klinetob | |
| 8,651,817 | B2 | 2/2014 | Radomski | |
| 8,696,319 | B2 | 4/2014 | Naik | |

(Continued)

FOREIGN PATENT DOCUMENTS

| | | | |
|---|---|---|---|
| EP | 2615246 | A1 | 7/2013 |
| FR | 3051824 | A1 | 12/2017 |

*Primary Examiner* — Courtney D Heinle
*Assistant Examiner* — Cameron A Corday
(74) *Attorney, Agent, or Firm* — McGarry Bair PC

(57) ABSTRACT

A gas turbine engine includes a fan section, a compressor section, a combustion section, and a turbine section in serial flow arrangement, and defining an engine centerline extending between a forward direction and an aft direction. A disk includes a slot for mounting a composite airfoil to the disk. An axial retainer couples to the disk and secures the composite airfoil to the disk. A compliant portion positioned at the composite airfoil abuts the composite airfoil during operation of the gas turbine engine to secure the composite airfoil to the disk.

20 Claims, 14 Drawing Sheets

(56) References Cited

U.S. PATENT DOCUMENTS

| | | | | |
|---|---|---|---|---|
| 10,793,254 | B2 | 10/2020 | Stamps | |
| 11,073,030 | B1 | 7/2021 | Husband | |
| 2009/0226321 | A1 | 9/2009 | Buisson | |
| 2011/0081235 | A1 | 4/2011 | Shah | |
| 2011/0110781 | A1 | 5/2011 | Dao | |
| 2013/0272886 | A1 | 10/2013 | Dimmick, III | |
| 2015/0093248 | A1 * | 4/2015 | Care | F04D 29/34<br>416/220 R |
| 2017/0037738 | A1 | 2/2017 | Marin | |
| 2017/0101878 | A1 * | 4/2017 | Wang | F01D 25/005 |
| 2017/0218973 | A1 * | 8/2017 | Bishop | F04D 29/34 |
| 2019/0186276 | A1 | 6/2019 | Joly | |
| 2020/0018179 | A1 | 1/2020 | Kling | |
| 2025/0109690 | A1 | 4/2025 | Kray | |

* cited by examiner

TURBINE ENGINE WITH COMPLIANT AXIAL RETAINER

CROSS-REFERENCE TO RELATED APPLICATION

This application claims priority to and is a continuation of U.S. patent application Ser. No. 18/480,169, filed Oct. 3, 2023, currently pending, the entirety of which is incorporated herein by reference.

TECHNICAL FIELD

The present disclosure relates generally to a component for a turbine engine, and more particularly, to a retainer for securing an airfoil to a disk.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
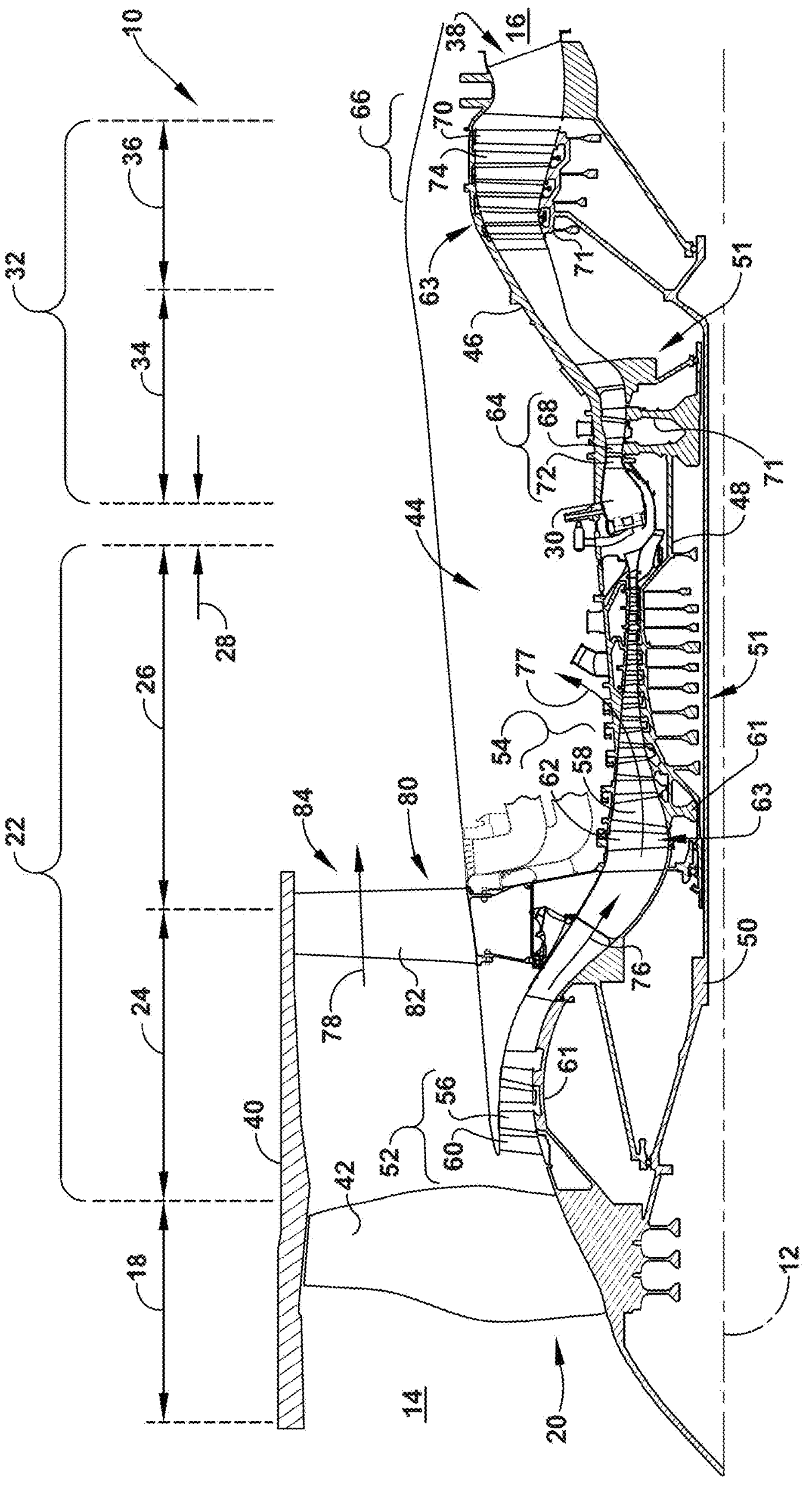
FIG. 1 is a schematic cross-sectional view of a turbine engine in accordance with an exemplary aspect of the present disclosure.

Aspects of the disclosure herein are directed to an axial retainer used to secure retention of an airfoil to a disk. Airfoils can be slidably secured to the disk. The axial retainer secures the axial position of the airfoil relative to the disk to ensure that the airfoil does not detach from the disk. The airfoil can be a fan blade, a compressor blade, or a turbine blade. While this disclosure is provided as an airfoil axially retained to a disk, it should be appreciated that the disclosure can apply to non-airfoil-to-disk attachments, such as with a shroud or combustor liner. Further, while described in terms of a turbine engine for an aircraft, it will be appreciated that the present disclosure is applied to any other suitable environments, including terrestrial and non-terrestrial applications, or where turbine engines requiring axial retention are utilized.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "fore" or "forward" may mean in front of something and "aft" or "rearward" mean behind something, and may be relative to a flow direction of a fluid through an engine. For example, when used in terms of fluid flow, fore/forward can mean upstream and aft/rearward can mean downstream.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, front, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining the modulus of elasticity under tension or compression, may relate to an elasticity for a particular material or structure made of such material, such as the engine components described herein. The elasticity can represent the stress per unit area relative to the local strain or proportional deformation thereof, or can be represented as a bulk modulus, as a ratio of force to deformation.

As used herein, the term "strength" may be used as defining a value for a material or element as a maximum load or force that the material or element can bear before deformation or failure of the material. "Strength" can include a tensile strength, a compressive strength, a shear strength, or a torsional strength for example. The strength can be represented or defined as, at least partially, an ultimate strength, a plasticity, a brittleness, a yield strength, a flexural strength, a hardness, a toughness, or resistance such as electrical resistance, shock resistance, wear resistance, or corrosion resistance.

As used herein, the term "compliance," "compliant," or "compliancy" may be used as defining a material or element that can deform, flex, move, or displace in response to a load or force. Such a compliance can be related to the elasticity of the body upon which the force acts. Compliance can be inversely proportional to stiffness, for example.

As used herein, the term "resistance" or "resistive force" may be used as defining a vector sum of force imparted against, to resist, or in a direction opposite of a force acting on a particular element or object. For example, "resistance" or "resistive force" may be a normal force exerted against by the particular element or object, as well as a frictional force, contact force, drag force, or viscous force in additional non-limiting examples, and may be defined by the stiffness, elasticity, or strength of the particular element or object.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can be cured at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can be processed post-curing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled, coated, or both, prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal. A "non-metallic" material, as used herein, is indicative of a material that excludes metal, or is formed as a hybrid of metal and non-metal materials.

The inventors' practice has proceeded in the foregoing manner of designing a retention system as an axial retainer for securing an airfoil to a disk and designing the axial retainer to have improved compliancy for extreme loading when using a composite airfoil or axial retention for a compliant component. Traditional retention systems can utilize a material that crushes under axial loading. However, after crush deformation, these retention systems fail to return to their original shape or position, and cannot provide compliant retention, particularly over time.

FIG. 1 is a schematic cross-sectional diagram of a turbine engine 10 for an aircraft. The turbine engine 10 has a generally longitudinally extending axis or engine centerline 12 extending from a forward direction 14 to an aft direction 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the LP or HP compressor 24, 26 can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the HP or LP turbine 34, 36 can be mounted to a disk 71, which is mounted to the corresponding one of the HP and LP spools 48, 50. The static turbine vanes 72, 74 for a stage of the HP or LP compressor 24, 26 can be mounted to the core casing 46 in a circumferential arrangement.

Complementary to the rotor portion, the stationary portions of the turbine engine 10, such as the static compressor or turbine vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30.

A remaining portion of the pressurized airflow 76 bypasses the LP compressor 24 and engine core 44 as a bypass airflow 78, and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
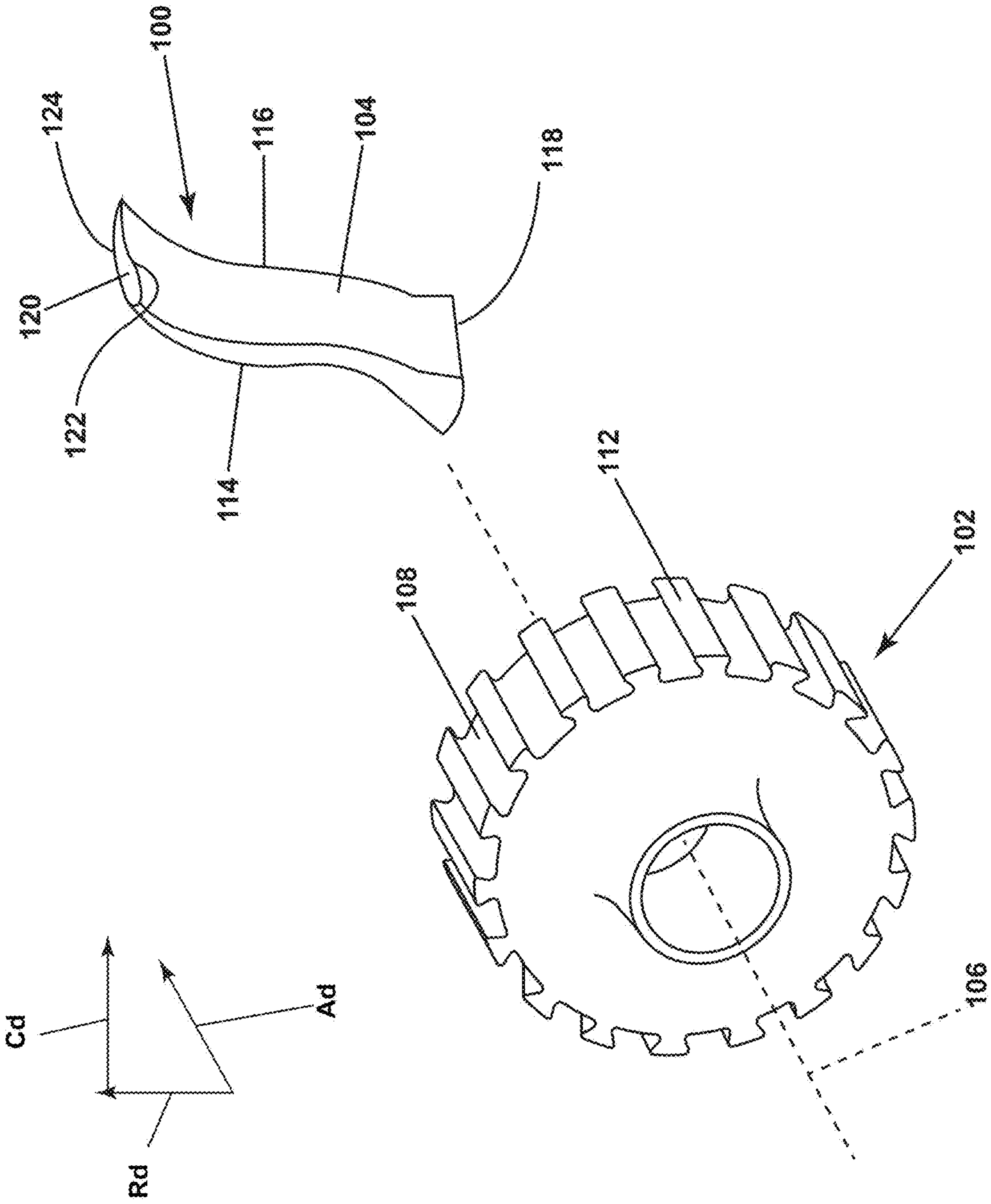
FIG. 2 is a schematic perspective view of a composite airfoil assembly and disk suitable for use within the turbine engine of FIG. 1, in accordance with an aspect of the present disclosure.

FIG. 2 is a schematic perspective view of a composite airfoil 100 and a disk 102 suitable for use within the turbine engine 10 of FIG. 1. The composite airfoil 100 can define a body 104. The disk 102 is suitable for use as the disk 61, 71 (FIG. 1) or any other disk such as, but not limited to, a disk within the fan section 18 (FIG. 1), the compressor section 22 (FIG. 1), or the turbine section 32 (FIG. 1) of the turbine engine 10 (FIG. 1). The composite airfoil 100 can be rotating or non-rotating such that the composite airfoil 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil 100 can be a composite fan blade.

The disk 102 can be rotatable or stationary about a rotational axis 106. The rotational axis 106 can coincide with, be parallel to, or be offset from the engine centerline 12 (FIG. 1). The disk 102 includes a plurality of slots 108 extending axially through a radially exterior surface 112 of the disk 102. The plurality of slots 108 are circumferentially spaced about the disk 102, with respect to the rotational axis 106, and permit the composite airfoil 100 to slidably secure to the disk 102.

The composite airfoil 100, and body 104 thereof, extends between a leading edge 114 and a trailing edge 116 to define a chord-wise direction, and extends between a root 118 and a tip 120 to define a span-wise direction. The composite airfoil 100 includes a pressure side 122 and a suction side 124.

The composite airfoil 100 couples to the disk 102 by inserting at least a portion of the composite airfoil 100 into a respective slot of the plurality of slots 108. The composite airfoil 100 is held in place by frictional contact with the slot 108 or can be coupled to the slot 108 via any suitable coupling method such as, but not limited to, welding, adhesion, fastening, or the like. While only a single composite airfoil 100 is illustrated, it will be appreciated that there can be any number of one or more composite airfoils 100 coupled to the disk 102. As a non-limiting example, there can be a plurality of composite airfoil 100 corresponding to a total number of slots of the plurality of slots 108.

For the sake of reference, a set of relative reference directions, along with a coordinate system can be applied to the composite airfoil 100 and the disk 102. An axial direction (Ad) can extend from forward to aft and is shown extending at least partially into the page. The axial direction (Ad) and can be arranged parallel to the rotational axis 106, which can also be arranged parallel to the engine centerline 12 (FIG. 1). A radial direction (Rd) extends perpendicular to the axial direction (Ad), which can extend perpendicular to the engine centerline 12. A circumferential direction (Cd) can be defined perpendicular to the radial direction (Rd), which can be defined along a curvature of a circumference about the axial direction (Ad), can be defined as a ray extending locally from the radial direction (Rd), and/or can be defined along the circumference of the turbine engine 10 (FIG. 1) relative to the engine centerline 12 (FIG. 1) or rotational axis 106.

Figure 3:
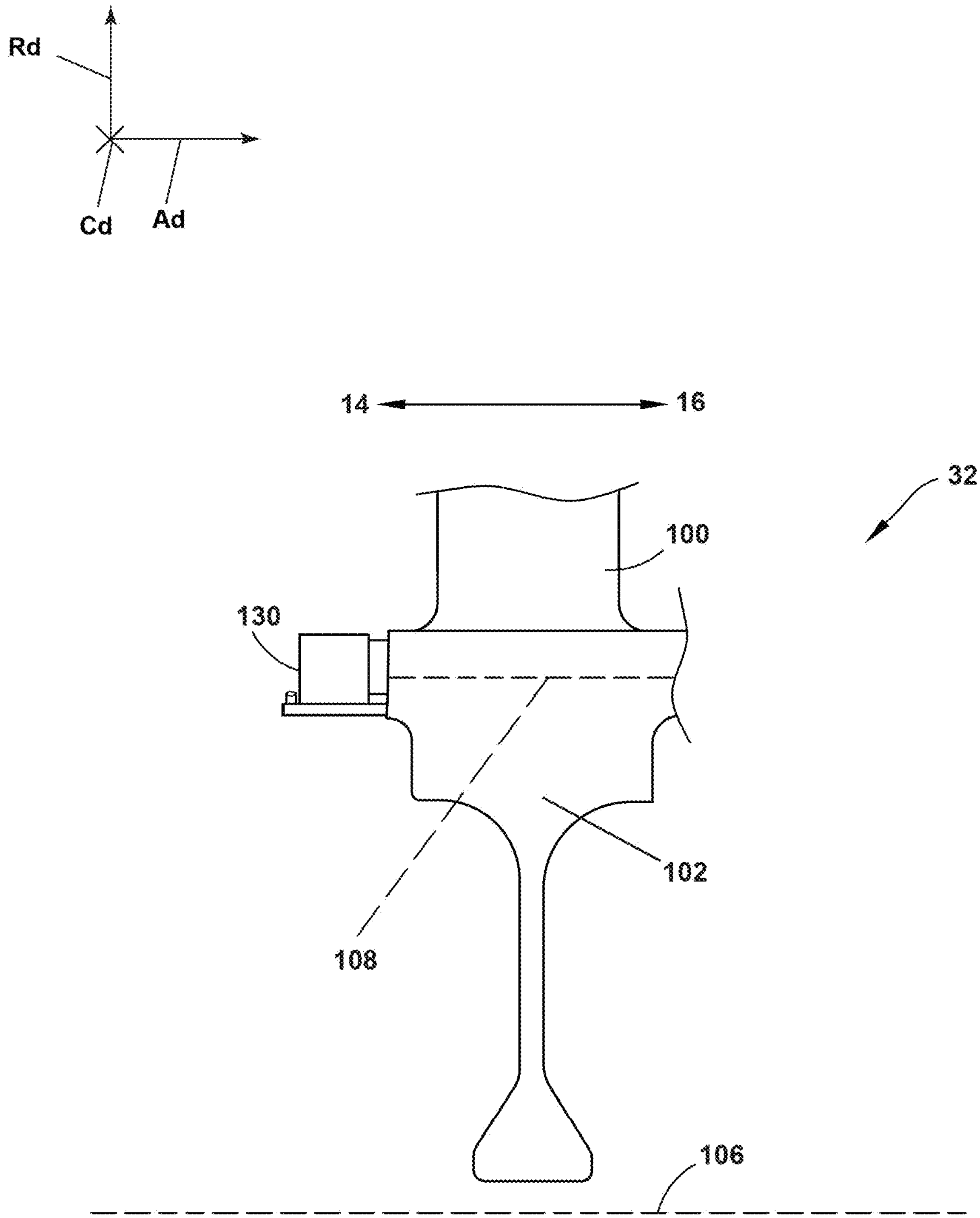
FIG. 3 is a schematic sectional view of a portion of the turbine engine of FIG. 1 with an axial retainer securing a composite airfoil to a rotating disk, in accordance with an exemplary aspect of the present disclosure.

FIG. 3 is a schematic sectional view of a portion of the turbine section 32 and illustrates the composite airfoil 100 coupled to the disk 102 with an axial retainer 130 securing the composite airfoil 100 to the disk 102. As shown in FIG. 3, the circumferential direction (Cd) can be defined perpendicular to the radial direction (Rd), represented with an "X" that extends into and out of the page, and can be defined as a circumference relative to the rotational axis 106.

The composite airfoil 100 can be more compliant than metallic airfoils, for example, and can include increased compliancy in the surrounding retention system (e.g., the disk 102 and axial retainer 130). During engine operation, the axial retainer 130 permits compliant movement of the composite airfoil 100 in the axial direction Ad. The axial retainer 130 reduces resistive force experienced by the composite airfoil 100 from the axial retainer 130 during engine loading, which can reduce stress on the composite airfoil 100, reducing cycle fatigue and extending component lifetime. The reduction in resistive force is achieved through compliance of the axial retainer 130, which at least partially deforms in response to the loading force exerted against the axial retainer, and then at least partially returns to its original shape after a reduction or cessation in the engine loading.

During engine operation, the composite airfoil 100 is subjected to engine and loading forces, which can include forces that tend to move or bend the composite airfoil 100 in the forward direction 14 or the aft direction 16, or in a direction which would disengage or decouple the composite airfoil 100 from the disk 102. The axial retainer 130 can position either forward or aft of the composite airfoil 100, depending on the specific engine implementation, and retains the composite airfoil 100 within the slot 108 under such engine forces.

Figure 4:
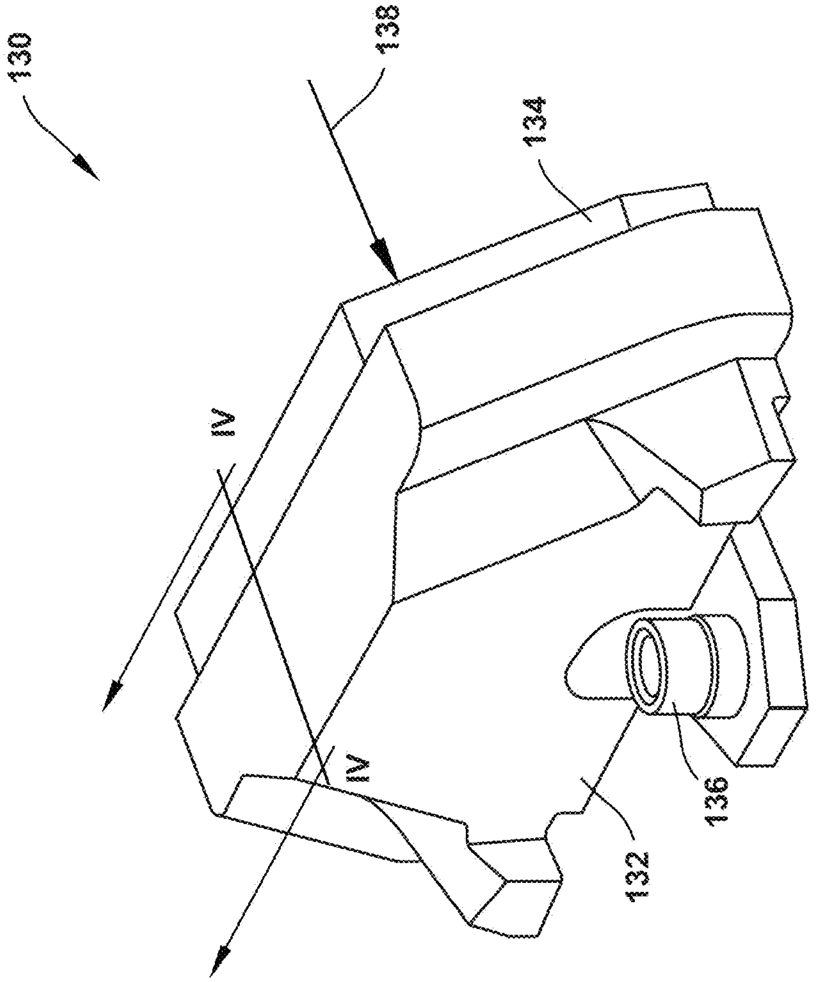
FIG. 4 is a perspective view of the axial retainer of FIG. 3, in accordance with an exemplary aspect of the present disclosure.

FIG. 4 shows a perspective view of the axial retainer 130, which includes a body 132 coupled to a compliant portion 134. The body 132 includes a receiver 136 adapted to receive a fastener (not shown), such as a bolt or threaded fastener, to secure the axial retainer 130 to the disk 102 (FIG. 3). While only one receiver 136 is shown, any number or suitable type of attachment or mounting system to secure the axial retainer 130 to the disk 102 is contemplated. The body 132 can be metallic, such as made from one or more metals, such as nickel, tungsten, or titanium, in non-limiting examples, or composite metals including composites of more than one metallic material. The body 132 can define a first bulk modulus defined by the materials comprising the body 132. In a non-limiting example, the bulk modulus can be the same or greater than that of the disk 102.

The compliant portion 134 can be a compliant or resilient element that can compress or otherwise deform in response to a loading force, such as a force 138 referred to herein, against the axial retainer 130, and then fully or at least partially returns to its original shape after cessation of the loading force. For example, after cessation of the loading force, it is contemplated that the compliant portion 134 returns fully to its non-deformed shape, or in alternate non-limiting examples, the compliant portion can return to at least 90% of the non-deformed shape or to at least 80% of the non-deformed shape, such as when acted upon by an excessive force outside of operational expectations. In a non-limiting example, the complaint portion 134 can be non-metallic, or a hybrid of metallic and non-metallic materials. In another non-limiting example, the compliant portion 134 defines a second bulk modulus defined by the materials or structure of the compliant portion 134. In one non-limiting example, the second bulk modulus can be less than the first bulk modulus of the body 132. Suitable materials that can be utilized for the compliant portion 134 include, but are not limited to, rubber, polyurethane, urethane, or foams. Additionally, or alternatively, the compliant portion 134 can define a yield strength that is lower than the body 132. In a non-limiting example, the yield strength can be 50% of the body 132.

Figure 5:
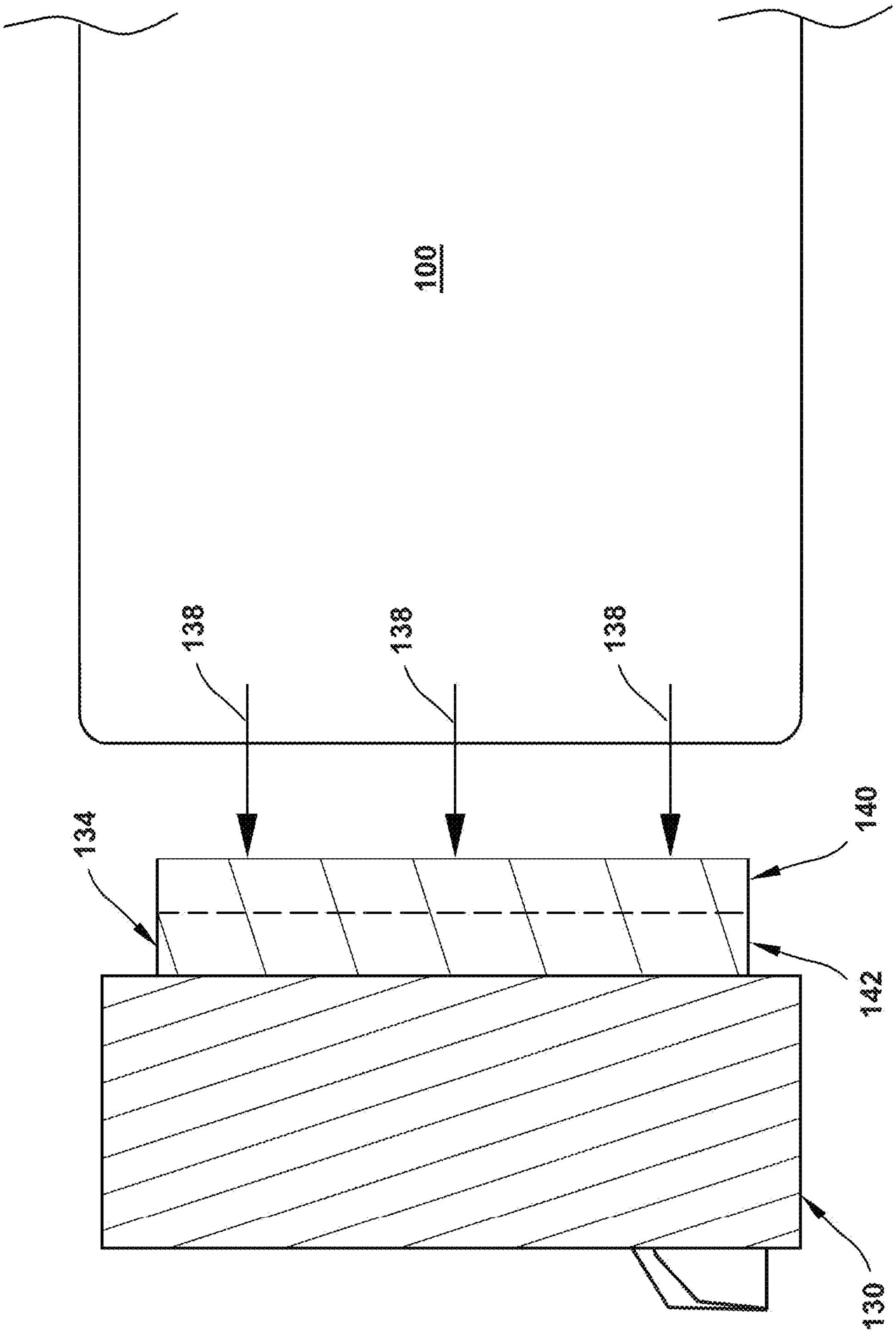
FIG. 5 is a schematic sectional view of the axial retainer of FIG. 4 being acted upon by a force from the composite airfoil of FIG. 3, in accordance with an exemplary aspect of the present disclosure.

Referring to FIG. 5, the force 138 can be imparted to the axial retainer 130 from the abutting composite airfoil 100 during engine operation. The axial retainer 130 secures the position of the composite airfoil 100 to prevent separation of the composite airfoil 100 from the disk 102 (FIG. 3). The compliant portion 134 can be deformable from a non-deformed shape 140 to a deformed shape 142. The deformed shape 142 is represented via a dashed line relative to the non-deformed shape 140. The compliant portion 134 deforms from the non-deformed shape 140 to the deformed shape 142 in response to the force 138. After cessation of the force 138, the compliant portion 134 can return fully or at least partially to its non-deformed shape 140.

During engine operation, engine forces can move or push the composite airfoil 100 toward the axial retainer 130, thereby defining the force 138 acting upon the axial retainer 130. The compliant portion 134 of the axial retainer 130 deforms in response to the force 138, providing compliance for the composite airfoil 100. Compliance for the composite airfoil 100 can reduce stress and strain on the composite airfoil 100 to improve durability and compliance while operating under high engine loading conditions. The axial retainer 130 provides such compliance with the compliant portion 134, permitting deformation in response to the force 138, and returning to its original position after the force 138 ceases.

Furthermore, the axial retainer 130 with the compliant portion 134 permits the composite airfoil 100 to contact the axial retainer 130 with reduced resistive force. Such a reduced resistive force is provided by the compliance of the compliant portion 134, which generates a decreased resistive force as compared to an axial retainer without a compliant portion. The compliant portion 134 further permits tailoring of the compliancy to the system in which it is incorporated, where the materials or geometries utilized for the compliant portion 134 can be varied to tailor compliant properties to the particular system or anticipated loading scenario, such as that of a turbine blade.

Figure 6:
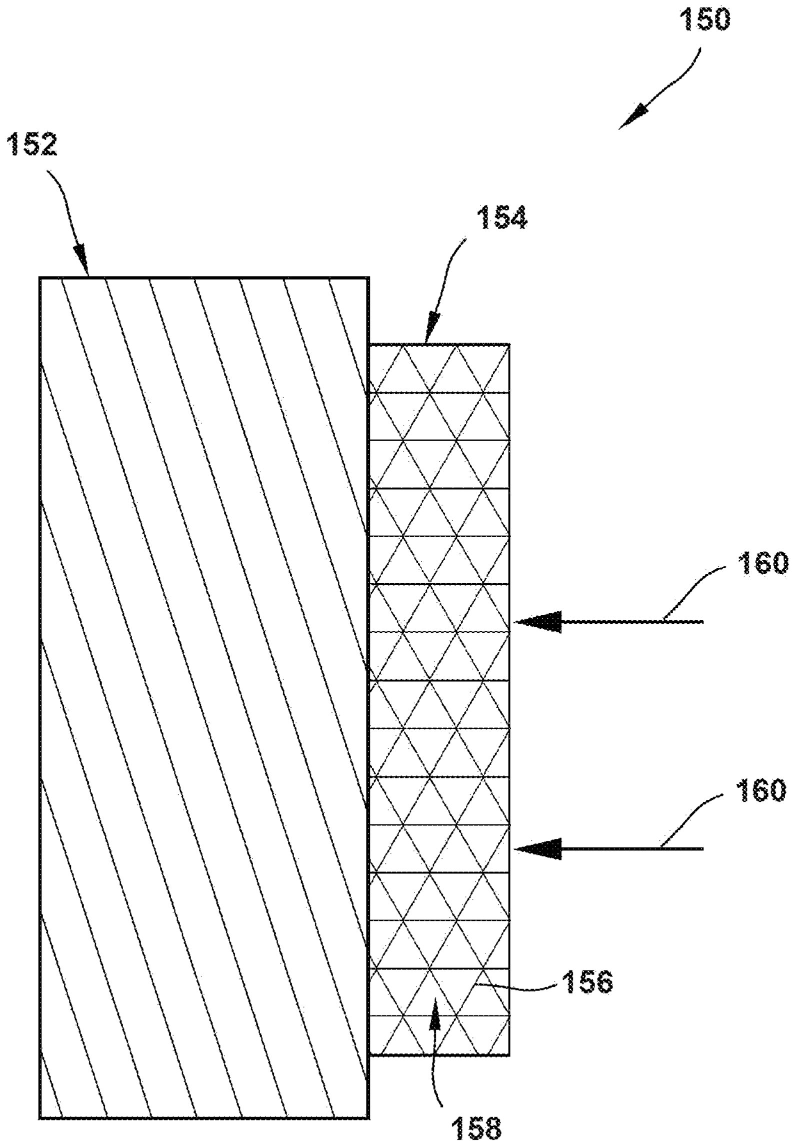
FIG. 6 is a schematic sectional view of another exemplary axial retainer including a lattice material, in accordance with an exemplary aspect of the present disclosure.

Referring to FIG. 6, a schematic section view of another exemplary axial retainer 150 includes a body 152 and a compliant portion 154. The compliant portion 154 can be a lattice material 156, shown as having a lattice structure. Alternative lattice structures in non-limiting examples include oblique, square, hexagonal, triangular, rectangular, triclinic, monoclinic, orthorhombic, tetragonal, cubic, trigonal structures, or combinations thereof. The lattice material 156 for the compliant portion 154 can define one or more open areas, gaps, or spaces 158 that permit compression when acted on by a force 160, and then at least partially returning to an original shape after cessation of the force 160. The spaces 158 can be empty, being open-cells, or may be filled with matter such including engine gasses permitted to pass through the spaces 158 during engine operation. In another non-limiting example, the spaces 158 may be permanently filled, such as with a pressurized gas. Alternatively, or additionally, it is contemplated that the spaces 158 are filled with a compliant material, which can be used to control the deformation of the compliant portion 154. Such a compliant material can be dissimilar from the compliant material of the compliant portion 154, while similar materials at different densities or having other different properties is contemplated. The geometric shape of the lattice material 156 and its spaces 158 (or the material provided therein), in combination with the materials utilized as the lattice material 156 or provided within the spaces 158 permits the compliant portion 154 to deform when acted on by the force 160, and then return to its original shape after cessation of the force 160. In a non-limiting example, the lattice material 156, or materials filling the spaces 158, can expand in a direction orthogonal to the direction of compression. Suitable materials for the compliant portion 154 or filling the spaces 158 can include but are not limited to rubber, polyurethane, or other polymers.

The particular lattice geometry and materials utilized can be used to define material density, elasticity, stiffness, strength, or other material properties, which permits tuning of the compliance of the compliant portion 154 to the anticipated loading. For example, the thickness of the individual walls of the lattice material 156 can at least partially define the compliance, as well as the size or volume of the spaces 158 therebetween, which can be used to define the amount of compression permitted by the compliant portion 154. Similarly, the spaces 158 can provide for an overall weight reduction, which can benefit overall engine efficiency when filled with a gas or with a compliant material with less mass or density that that used for the lattice material 156.

Figure 7:
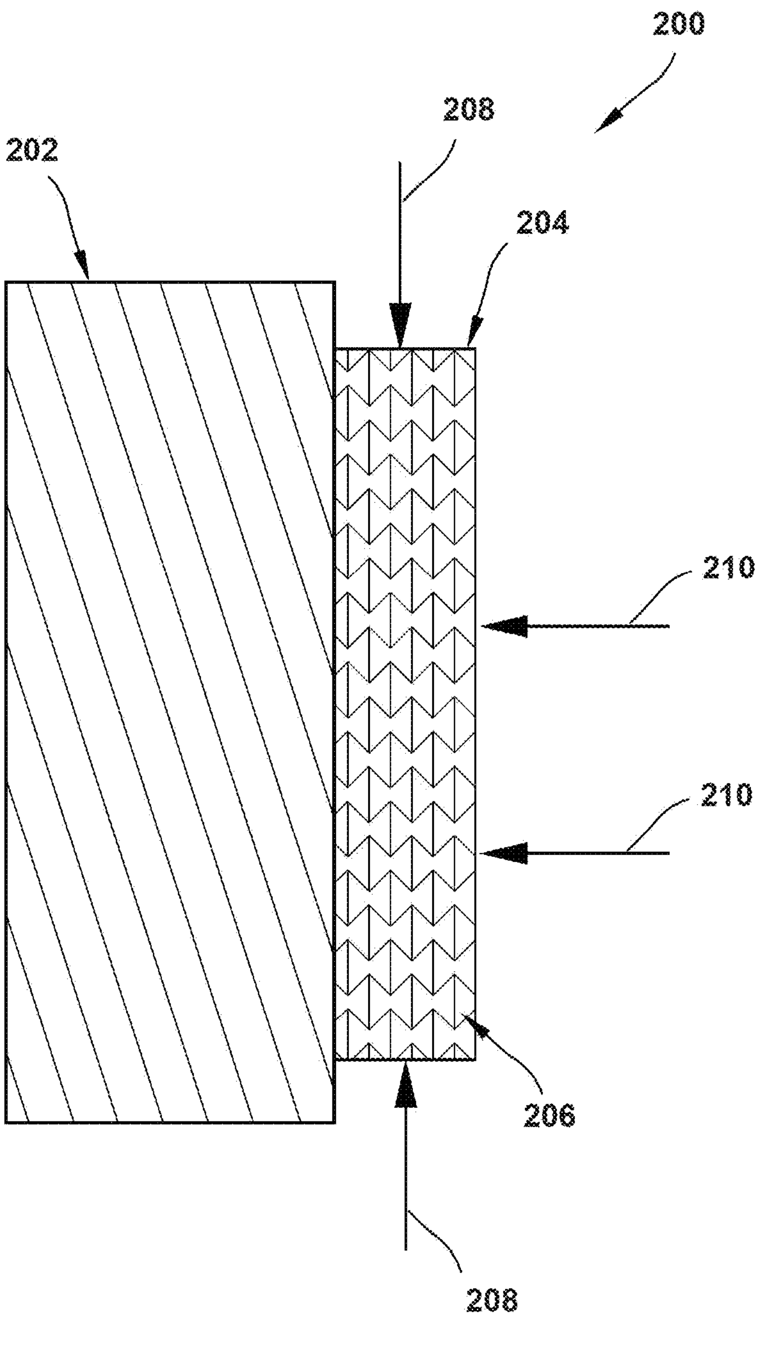
FIG. 7 is a schematic sectional view of another exemplary axial retainer including an auxetic material, in accordance with an exemplary aspect of the present disclosure.

FIG. 7 shows a schematic section view of another axial retainer 200 including a body 202 and a compliant portion 204. The compliant portion 204 can include an auxetic material 206. In one example, the auxetic material 206 can be a material defined by a negative Poisson ratio. The auxetic material 206 can be one that contracts in a contraction direction 208 orthogonal to the direction of compression resultant of a force 210. As a result of the contraction under compression, the material density for the compliant portion 204 increases under the compression. Therefore, as the force 210 is increasingly applied to the compliant portion 204, the density of the compliant portion 204 increases, resulting in an increase in the compliance response as the compression increases. That is, the resistance applied in response to the force 210 increases as the force 210 increases. The resulting response to the force 210 is non-linear, providing increasing compliance or an increasing rate of compliance as the force 210 increases.

Figure 8:
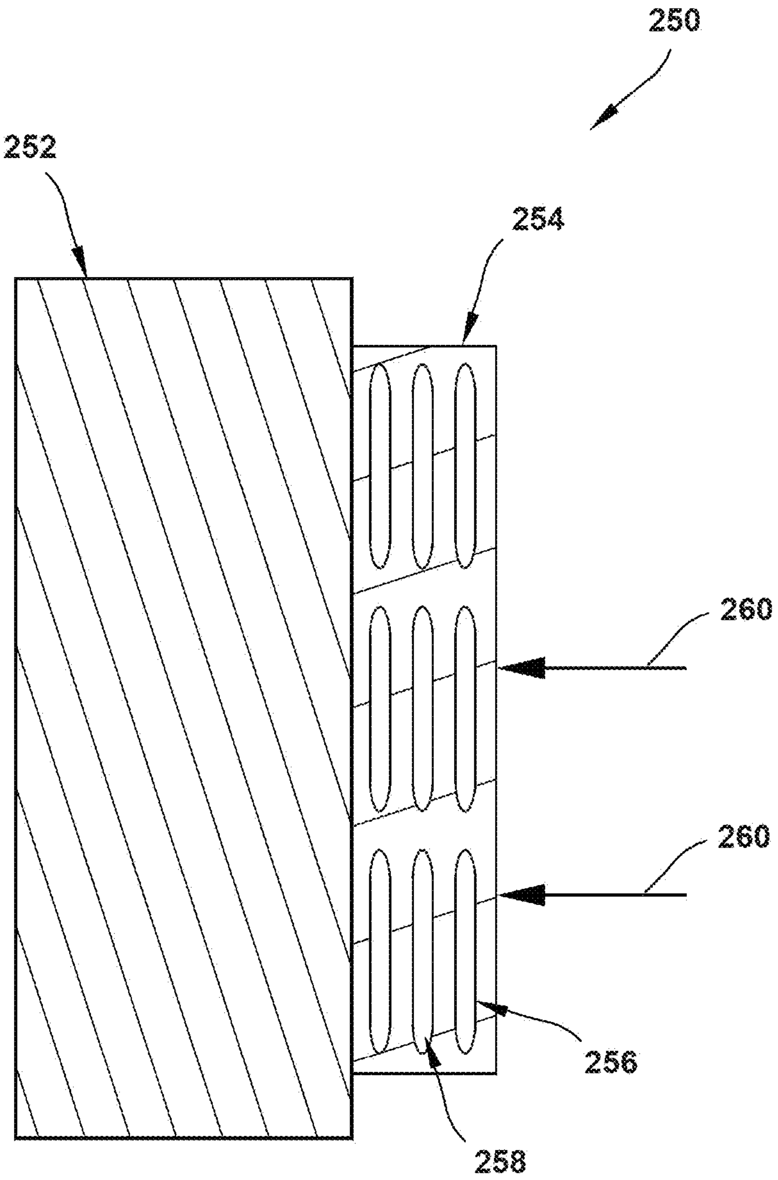
FIG. 8 is a schematic sectional view of another exemplary axial retainer including a perforated material, in accordance with an exemplary aspect of the present disclosure.

FIG. 8 shows a schematic section view of another axial retainer 250 including a body 252 and a compliant portion 254. The compliant portion 254 includes at least one opening 256, shown as a set of elongated orifices 258 extending through the compliant portion 254. The set of elongated orifices 258 defining the compliant portion 254 permit compression of the compliant portion 254 in response to a force 260, and returning at least partially to its original position after cessation of the force 260.

While shown as a set of nine elongated orifices 258, it should be understood that any number, arrangement, or position of the at least one opening 256 is contemplated. Further, while the set of elongated orifices 258 extend in a direction orthogonal to the direction of the force 260, any suitable arrangement for the set of elongated orifices 258 is contemplated, including but not limited to aligned, orthogonal to, or angled relative to the direction of the force 260. Additionally, while shown as a set of elongated orifices 258, the at least one opening 256 can include any suitable shape or cross section thereof, including but not limited to, circular, oval, elliptical, racetrack, square, rectangular, cubic, linear, curvilinear, unique, or any combination thereof. The particular arrangement and geometry for the at least one opening 256 can be used to define the compliance provided by the compliant portion 254. For example, the position, arrangement, or geometry for the at least one opening 256 can be used to locally increase or decrease the compliance response. Such local tailoring can be used to tailor the compliant response to that of the component or material providing the force 260, such as increasing compliance as radial distance from the engine centerline 12 (FIG. 1) increases.

Figure 9:
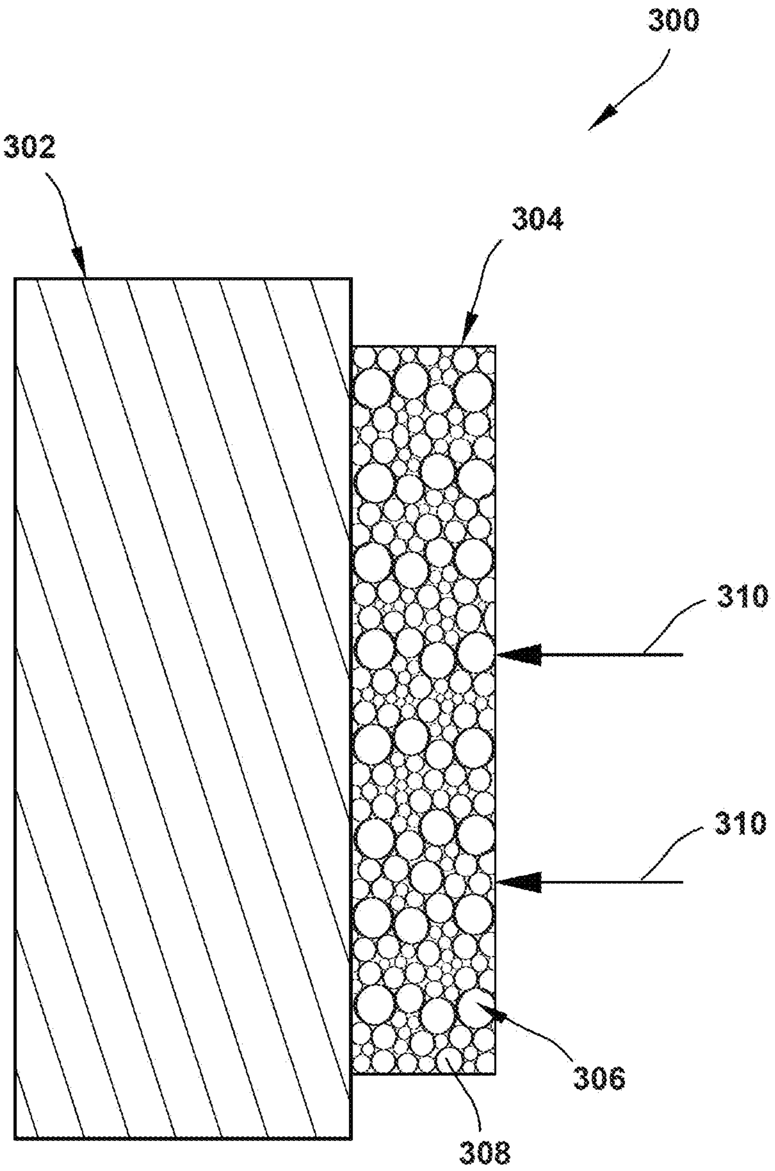
FIG. 9 is a schematic sectional view of another exemplary axial retainer including a porous material, in accordance with an exemplary aspect of the present disclosure.

Referring to FIG. 9, a schematic section view illustrates an axial retainer 300 including a body 302 and a compliant portion 304 provided as a porous material 306 having a plurality of pores 308. The porous material 306 can be a closed cell foam or an open cell porous foam in non-limiting examples. Where the porous material 306 is a closed cell foam, the closed cells can be filled with a gas, such as carbon dioxide ($CO_2$), for example. Such a gas can be maintained at a pressure that varies from two pounds per square inch absolute and one hundred pounds per square inch absolute (2 PSIA-100 PSIA), for example, while a pressure greater than atmospheric pressure at ground level is contemplated. Such a porous material 306 can be a material that compresses in response to a force 310, and then decompresses after cessation of the force 310, at least partially returning to its original shape.

Figure 10:
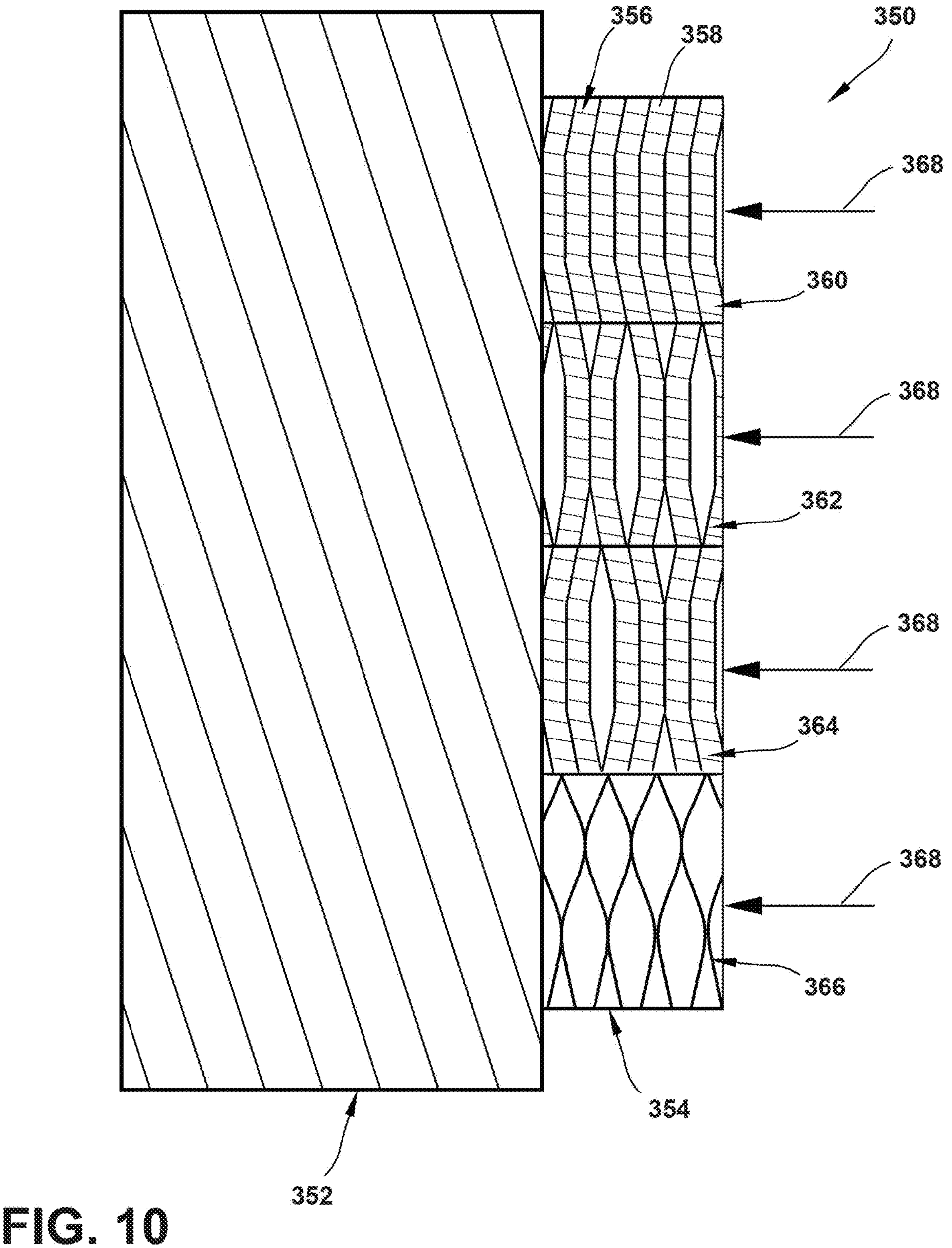
FIG. 10 is a schematic sectional view of another exemplary axial retainer including a spring, in accordance with an exemplary aspect of the present disclosure.

Referring to FIG. 10, a schematic section view illustrates an axial retainer 350 including a body 352 and a compliant portion 354. The compliant portion 354 can be formed as a set of springs 356. In one non-limiting example, the set of springs 356 can be formed as a set of Belleville washers 358, which can be arranged in an aligned, nested, or parallel arrangement 360, an offset or series arrangement 362, or an arrangement 364 as a combination thereof. In another non-limiting example, the set of springs 356 can include a set of wave springs 366. The set of springs 356 permit compression of the compliant portion 354 in response to a force 368, and then decompression after cessation of the force 368, at least partially returning to its original shape and position.

Additional non-limiting examples for the set of springs 356 can include, but are not limited to spring fingers, leaf springs, coil springs, locking washers, or split-ring washers, which may be arranged in nested or offset arrangements, or combinations thereof. In another non-limiting example, the springs can be formed as an array of springs, such as a cylinder array, while any suitable element providing a spring force can be utilized.

Additionally, while the set of springs 356 are arranged to compress in response to the force 368 in one direction, such as aligned with the force 368, it is contemplated that the springs can be arranged to dampen the force 368 in various directionalities. For example, the force 368 can extend in the axial direction (Ad) as shown, and can also vary from the axial direction (Ad), such as in the radial direction (Rd) or circumferential direction (Cd), or combinations of any two or more directions.

Figure 11:
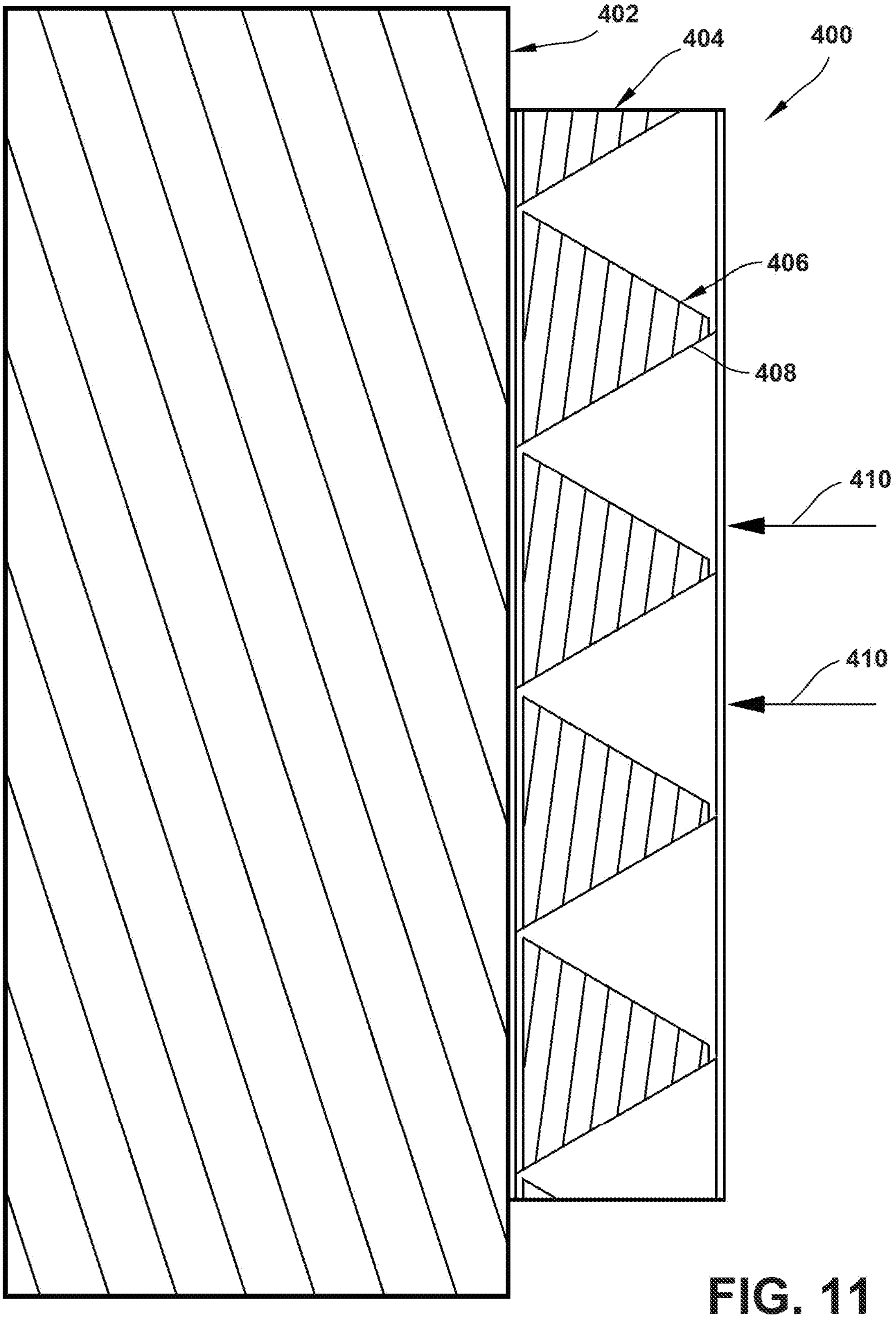
FIG. 11 is a schematic sectional view of another exemplary axial retainer including a tessellated structure, in accordance with an exemplary aspect of the present disclosure.

Referring to FIG. 11, a schematic section view illustrates an axial retainer 400 including a body 402 and a compliant portion 404. The compliant portion 404 can include a tessellation structure 406. The tessellation structure 406 can be an arrangement of a set of individual geometric units 408, which are interconnected or interfolded to form the tessellation structure 406. The shape and geometry of the individual geometric units 408 defines a system of interconnection to form the interconnected tessellation structure 406. Additionally, the particular geometry or materials used for the individual geometric units can define the directionality of the compression, as well as the resistive force. When acted upon by a force 410, the folded, interconnected structure of the tessellation structure 406 permits compression, and then can return at least partially to its original non-compressed state after cessation of the force 410, which can be defined by the geometric and interconnected structure of the tessellation structure 406. That is, no additional force is required to return the tessellation structure 406 fully or partially to its original non-compressed state.

Figure 12:
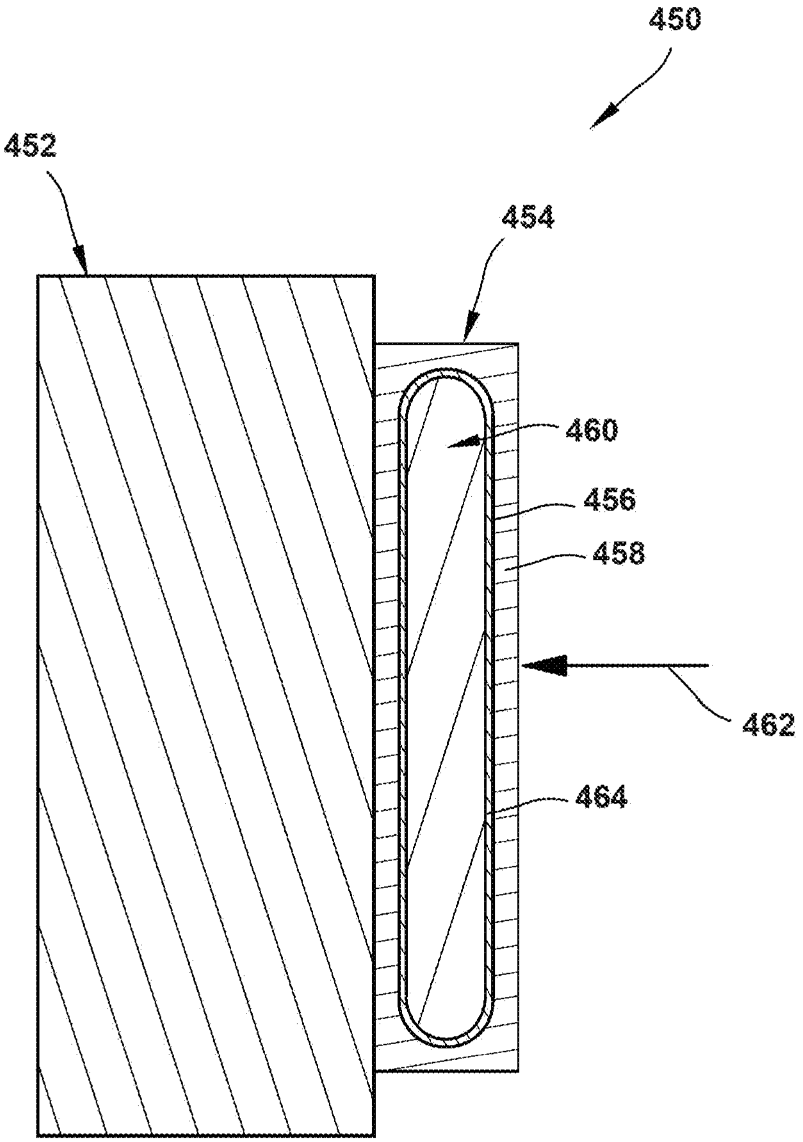
FIG. 12 is a schematic sectional view of another exemplary axial retainer including a bladder, in accordance with an exemplary aspect of the present disclosure.

Referring to FIG. 12, a schematic section view illustrates an axial retainer 450 including a body 452 and a compliant portion 454. The compliant portion 454 can include a bladder 456, including a bladder wall 464, housed within an outer wall 458 of the compliant portion 454. The bladder 456 can be made of a flexible or compliant material, such as a rubber or polymer, capable of deformation without leaking. The bladder 456 defines an interior 460 that can be filled with a gas or supercritical fluid, for example, that can be pressurized. For example, the interior 460 can be filled with pressurized $CO_2$.

In operation, a force 462 is applied to the compliant portion 454, and the bladder 456 can compress, along with the outer wall 458, providing compliance in response to the force 462. The particular pressure or material used to fill the bladder 456 can define the resistive force provided by the axial retainer 450.

Figure 13:
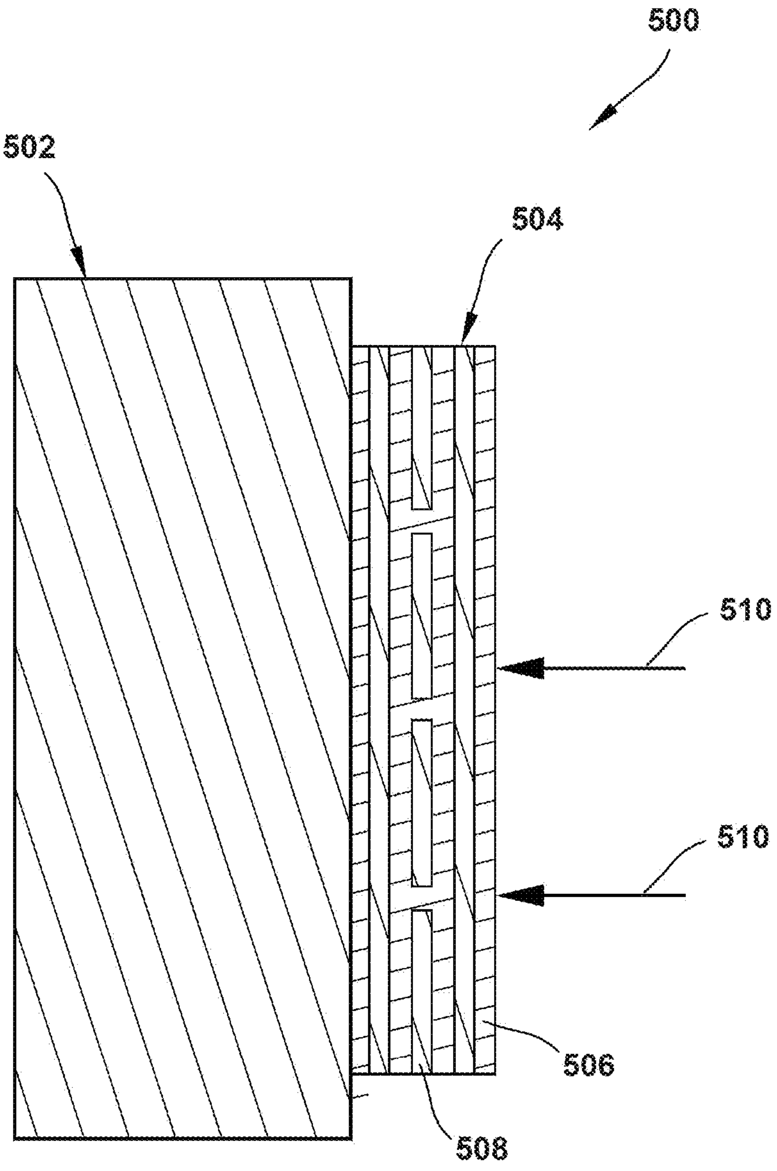
FIG. 13 is a schematic sectional view of an alternative axial retainer including stiffeners, in accordance with an exemplary aspect of the present disclosure.

Referring to FIG. 13, a schematic section view illustrates an axial retainer 500 including a body 502 and a compliant portion 504. The compliant portion 504 includes a compliant material 506 with at least one stiffener 508. The at least one stiffener 508 can be metallic, and can be made of a similar material to that of the body 502. The at least one stiffener 508 can extend fully through the compliant portion 504, or can extend partially or be discretely positioned within the compliant portion 504.

In operation, the compliant material 506 can compress in response to a force 510. The at least one stiffener 508 resists such compression, such as by having a greater hardness or lesser compliancy, relative to the compliant material 506, and can limit or otherwise restrict an amount, distance, or directionality of the compression of the compliant material 506. More specifically, as the force 510 deforms the compliant material 506, the at least one stiffener 508 does not deform, or deforms to a lesser extent than that of the compliant material 506. In this way, the amount of deformation, or the directionality of deformation, can be limited or otherwise defined through the use of the at least one stiffener 508.

Figure 14:
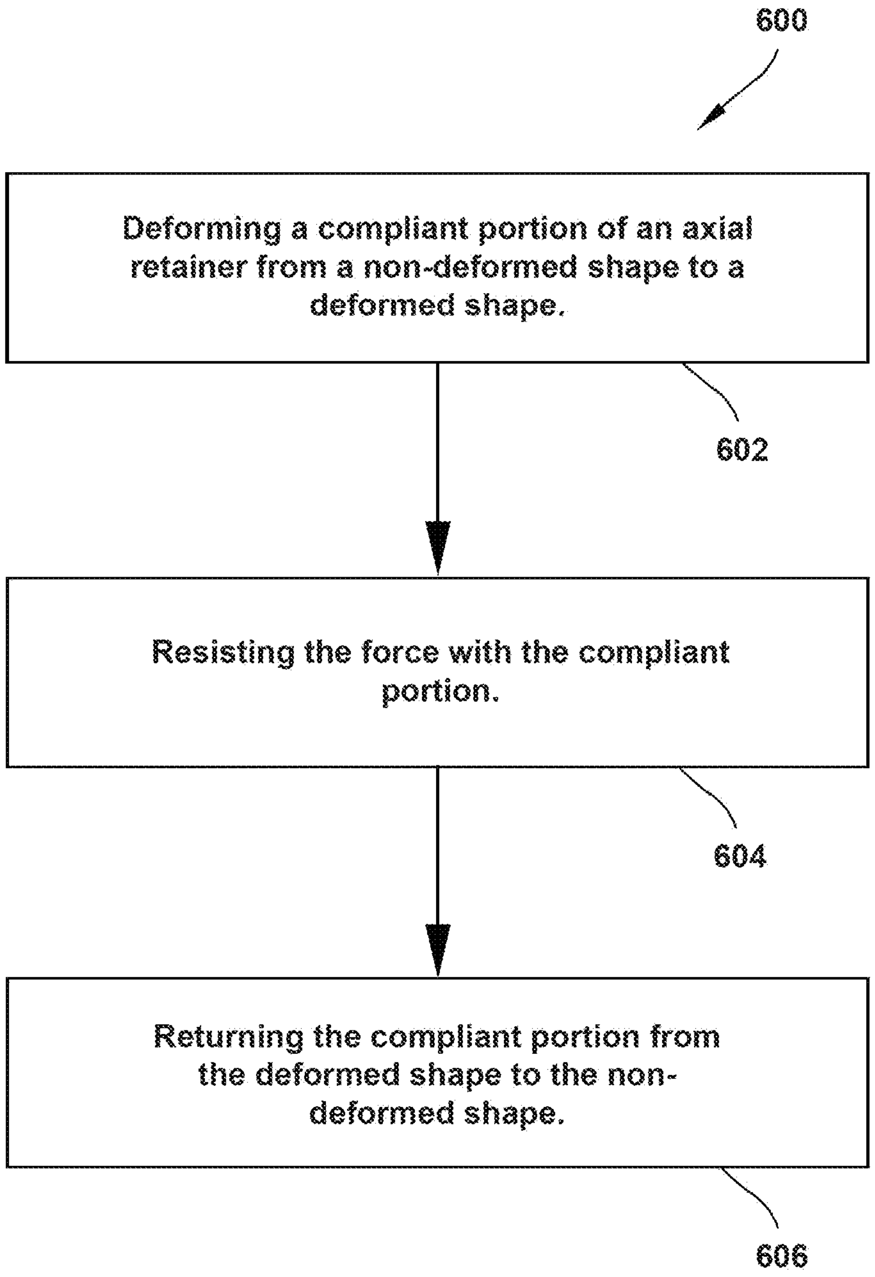
FIG. 14 is a flow chart illustrating a method of retaining a composite airfoil coupled to a disk with an axial retainer, in accordance with an exemplary aspect of the present disclosure.

Referring now to FIG. 14, a schematic chart illustrates a method 600 for retaining a composite airfoil coupled to a disk with an axial retainer. The composite airfoil can be the composite airfoil 100 of FIGS. 2, 3, and 5, as described herein, the disk can be the disk 71, 102 of FIGS. 1 and 2, as described herein, and the axial retainer can be the axial retainers 130, 150, 200, 250, 300, 350, 400, 450, 500 of FIGS. 4-13, in non-limiting examples.

The method 600 can include, at 602, deforming a compliant portion of the axial retainer, from a non-deformed shape to a deformed shape, such as the non-deformed shape 140 and deformed shape 142 of FIG. 5. The compliant portion can be the compliant portions 134, 154, 204, 254, 304, 354, 404, 454, 504 of FIGS. 4-13, as described herein, for example.

In one example, deforming of the compliant portion can include compression of the compliant portion in response to a force, such as the force 138, 160, 210, 260, 310, 368, 410, 462, 510 of FIGS. 4-12 provided from the composite airfoil 100 pushing against the axial retainer. The non-deformed shape can include the compliant portion in an uncompressed state, and the deformed shape can include the compliant portion in a compressed state. The compliant portion can be made of a compliant material, such as rubber, polyurethane, or urethanes that compress in response to the force, such as that shown in FIG. 5. In non-limiting examples, the compliant portion can include the lattice material 156 of FIG. 6, the auxetic material 206 of FIG. 7, the at least one opening 256 of FIG. 8, the porous material 306 of FIG. 9, the springs 356, 366 of FIG. 10, the tessellation structure 406 of FIG. 11, the bladder 456 of FIG. 12, the compliant material 506 of FIG. 13, or combinations thereof, in non-limiting examples, each of which can compress in response to the force.

At 604, the method 600 can include resisting the force with the compliant portion providing a resistive force. While the compliant portion is permitted to compress in order to deform, the compliant portion can resist that deformation in a number of ways. Resisting the deformation provides for tailoring the compliance to the particular system or implementation. For example, a composite airfoil as a rotating fan blade experiences different loading forces than that of a rotating high-pressure turbine blade. Therefore, it is within the scope of this disclosure to tailor the compliance of the axial retainer to its implementation, which can be done be defining the resistive force provided by the compliant portion. For example, the particular material properties can be used to define the resistive force, as a material with a greater bulk modulus resists deformation more than that of a material with a relatively lesser bulk modulus. Additionally, structural properties can be used to define the resistive force. For example, the resistive force can be varied by varying one or more of: a thickness for the walls of the lattice material 156 of FIG. 6 or the auxetic material 206 of FIG. 7; the pressure within the spaces 158 of FIG. 6; the size or position of the at least one opening 256 of FIG. 8; the density of the porous material 306 of FIG. 9; whether any pores or openings are closed-cell or open cell; an arrangement or type of spring 356, 366 of FIG. 10; a geometry of the tessellation structure 406 of FIG. 11; the size or fill material for the bladder 456 of FIG. 12; or an arrangement or thickness for the at least one stiffener 508 of FIG. 13 can be used to vary the resistive force provided by the compliant portion.

After the force reduces or ceases, such as through a reduction in cycle speed of the turbine engine 10 (FIG. 1), the method 600, at 606, can include returning the compliant portion from the deformed shape to the non-deformed shape. The material properties, such as material type, structure, or geometry, permits the compliant portion to at least partially or fully return to the non-deformed position. For example, a rubber material returns to its original shape after compression so long as it is not stretched beyond its elastic limit. Similarly, the shape, geometry, or sizing of the lattice material 156, the auxetic material 206, the at least one opening 256, the porous material 306, the bladder 456, as well as the spring force of the springs 356, 366, the arrangement and design of the tessellation structure 406, or the material or pressure within the at least one opening 256, the porous material 306, or the bladder 456, or any other suitable property or feature can be utilized to return the compliant portion to the non-deformed shape.

The benefits associated with utilizing a compliant portion for an axial retainer provide improved compliance for a component acting with force upon the axial retainer. Composite airfoil designs can benefit from a greater amount of compliance than traditional metal airfoils, and the axial retainer can provide at least some of the compliance benefitting the composite airfoils. The particular materials, geometries, patterns, thicknesses, pressures or other mechanical features used in the compliant portion can define the shape and amount of deformation in response to a loading force, and permitting the compliant portion to return to a non-deformed shape. This permits continued use of the axial retainer, where a retainer that merely deforms must be replaced after each individual use resulting in deformation.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan section, a compressor section, a combustion section, and a turbine section in serial flow arrangement, and defining an engine centerline extending between a forward direction and an aft direction; a disk provided in one of the fan section, the compressor section, or the turbine section and including a slot; a composite airfoil coupled to the disk at the slot; and an axial retainer coupled to the disk and securing the composite airfoil within the slot, the axial retainer including a compliant portion positioned to abut the composite airfoil.

The gas turbine engine of any preceding clause wherein the compliant portion is deformable from a non-deformed shape to a deformed shape in response to a force from the composite airfoil acting on the axial retainer, and wherein the compliant portion returns at least partially to its non-deformed shape after cessation of the force.

The gas turbine engine of any preceding clause wherein the compliant portion returns fully to the non-deformed shape after cessation of the force.

The gas turbine engine of any preceding clause wherein the compliant portion expands in a direction orthogonal to the force.

The gas turbine engine of any preceding clause wherein the compliant portion is made of a rubber, a polyurethane, a urethane, or a polymer.

The gas turbine engine of any preceding clause wherein the compliant portion is arranged forward of the composite airfoil.

The gas turbine engine of any preceding clause wherein the axial retainer includes a body and the compliant portion coupled to the body.

The gas turbine engine of any preceding clause wherein the body is metallic and defines a first bulk modulus.

The gas turbine engine of any preceding clause wherein the compliant portion defines a second bulk modulus that is less than the first bulk modulus.

The gas turbine engine of any preceding clause wherein the body defines a first yield strength and the compliant portion defines a second yield strength that is less than the first yield strength.

A gas turbine engine with a fan section, a compressor section, a combustion section, and a turbine section in serial flow arrangement, and arranged as a rotor and a stator, whereby the rotor rotates about an engine centerline, the gas turbine engine comprising: a composite component; and an axial retainer for securing the composite component to one of the rotor or the stator, having a non-deformed shape and a deformed shape, wherein the deformed shape is defined in response to a force acting on the axial retainer from the composite component.

The gas turbine engine of any preceding clause wherein the composite component is a composite airfoil.

The gas turbine engine of any preceding clause wherein the axial retainer secures the composite airfoil to the rotor.

The gas turbine engine of any preceding clause wherein the compliant component is made of a rubber, a polyurethane, a urethane, or a polymer.

The gas turbine engine of any preceding clause wherein the composite component includes a body and a compliant portion.

The gas turbine engine of any preceding clause wherein the body defines a first yield strength and the compliant portion defines a second yield strength that is less than the first yield strength.

The gas turbine engine of any preceding clause further comprising a stiffener provided within the compliant portion.

The gas turbine engine of any preceding clause wherein the stiffener is made from a material that is the same as the body.

The gas turbine engine of any preceding clause wherein the compliant portion includes at least one opening.

The gas turbine engine of any preceding clause wherein the at least one opening is arranged as a set of elongated orifices extending through the compliant portion.

The gas turbine engine of any preceding clause wherein the compliant portion is formed as a lattice.

The gas turbine engine of any preceding clause wherein the lattice is formed as a lattice body.

The gas turbine engine of any preceding clause wherein the lattice defines a plurality of spaces.

The gas turbine engine of any preceding clause wherein the plurality of spaces are empty.

The gas turbine engine of any preceding clause wherein the compliant portion comprises an auxetic material.

The gas turbine engine of any preceding clause wherein the auxetic material contracts in a direction orthogonal to the force.

The gas turbine engine of any preceding clause wherein the auxetic material provides a non-linear response in response to the force.

The gas turbine engine of any preceding clause wherein the compliant portion comprises a foam.

The gas turbine engine of any preceding clause wherein the foam comprises an open cell foam.

The gas turbine engine of any preceding clause wherein the foam comprises a closed cell foam.

The gas turbine engine of any preceding clause wherein the closed cell foam includes a plurality of cells that contain a gas.

The gas turbine engine of any preceding clause wherein the gas is a pressurized gas having a pressure that can vary between two pounds per square inch absolute and one hundred pounds per square inch absolute (2 PSIA-100 PSIA).

The gas turbine engine of any preceding clause wherein the pressure is greater than atmospheric pressure at ground level.

The gas turbine engine of any preceding clause wherein the compliant portion is arranged as a set of springs.

The gas turbine engine of any preceding clause wherein the set of springs are provided as one or more of coil springs, leaf springs, spring fingers, wave springs, Belleville washers, or split-ring washers.

The gas turbine engine of any preceding clause wherein the set of springs are arranged as an array of springs.

The gas turbine engine of any preceding clause wherein the array of springs are arranged to compress in a direction aligned with the force.

The gas turbine engine of any preceding clause wherein at least some springs of the set of springs are in a nested arrangement.

The gas turbine engine of any preceding clause wherein at least some springs of the set of springs are in an offset arrangement.

The gas turbine engine of any preceding clause wherein the compliant portion is formed as a tessellation structure.

The gas turbine engine of any preceding clause wherein the tessellation structure includes a set of geometric units which are interfolded to form the tessellation structure.

The gas turbine engine of any preceding clause wherein the compliant portion includes a bladder.

The gas turbine engine of any preceding clause wherein the compliant portion further includes an outer wall surrounding the bladder.

The gas turbine engine of any preceding clause wherein the bladder is filled with a gas or a supercritical fluid.

A method for compliantly retaining a composite airfoil coupled to a disk with an axial retainer, the method comprising: deforming the axial retainer from a non-deformed shape to a deformed shape in response to a force; and returning, at least partially, the compliant portion from the deformed shape to the non-deformed shape after cessation of the force.

The method of any preceding clause wherein the force is provided by the composite airfoil against the axial retainer.

The method of any preceding clause wherein deforming the axial retainer further includes deforming a compliant portion of the axial retainer.

The method of any preceding clause further comprising fully returning from the deformed shape to the non-deformed shape after cessation of the force.

The method of any preceding clause further comprising resisting deformation from the non-deformed shape with a stiffener provided within the compliant portion.

The method of any preceding clause wherein the compliant portion includes an opening, and deforming of the compliant portion includes compression of the compliant portion at the opening.

The method of any preceding clause wherein the compliant portion is formed as a lattice having a set of spaces, and wherein deforming of the compliant portion includes compression of the lattice into the set of spaces.

The method of any preceding clause wherein the compliant portion is formed as an auxetic material.

The method of any preceding clause wherein deforming of the compliant portion includes compression of the compliant portion in a direction orthogonal to the force.

The method of any preceding clause wherein the compliant portion includes a closed cell foam with a plurality of cells that contain a gas that compresses in order to deform from the non-deformed shape to the deformed shape.

The method of any preceding clause wherein the compliant portion is arranged as a set of springs, and wherein the set of springs collectively define a spring force, deform in response to the force, and returns to the non-deformed shape after cessation of the force.

The method of any preceding clause wherein the set of springs are arranged to compress in a direction aligned with the force.

The method of any preceding clause wherein the compliant portion is formed as a tessellation structure having a set of geometric units which are interfolded, and wherein the set of geometric units can interfold further into one another in order to deform from the non-deformed shape in response to the force.

The method of any preceding clause wherein the compliant portion includes a bladder filled with a gas or a supercritical fluid, and deformation of the compliant portion from the non-deformed shape to the deformed shape includes compression of the bladder or of the gas or the supercritical fluid.

What is claimed is:

1. A gas turbine engine comprising:

a fan section, a compressor section, a combustion section, and a turbine section in serial flow arrangement, and defining an engine centerline extending between a forward direction and an aft direction;

a disk provided in one of the fan section, the compressor section, or the turbine section and including a slot;

a composite airfoil coupled to the disk at the slot; and an axial retainer coupled to the disk and securing the composite airfoil within the slot, the axial retainer including a compliant portion positioned to directly abut the composite airfoil; and at least one void provided in the compliant portion;

wherein the compliant portion is made from a compliant material that is deformable from a non-deformed shape to a deformed shape in response to a force from the composite airfoil acting on the axial retainer, and wherein the compliant portion returns at least partially to its non-deformed shape after cessation of the force resultant of a compliancy of the compliant material.

2. The gas turbine engine of claim 1, wherein the at least one void is at least one opening.

3. The gas turbine engine of claim 1, wherein the at least one void is defined by a porous material for the compliant portion.

4. The gas turbine engine of claim 3, wherein the at least one void is a plurality of voids defined by the porous material.

5. The gas turbine engine of claim 4, wherein the porous material forms an entirety of the compliant portion.

6. The gas turbine engine of claim 3, wherein the porous material is a closed cell foam with a pressure between 2 PSIA-100 PSIA.

7. The gas turbine engine of claim 1, wherein the at least one void is defined by a lattice structure having one or more spaces, and the one or more spaces defines the at least one void.

8. The gas turbine engine of claim 1, wherein the at least one void is defined by a set of orifices within the compliant portion.

9. The gas turbine engine of claim 8, wherein the set of orifices are provided as a set of elongated orifices.

10. The gas turbine engine of claim 9, wherein the set of elongated orifices extend in a direction orthogonal to an expected direction of force against the compliant portion.

11. The gas turbine engine of claim 1, wherein the at least one void is defined within a bladder.

12. The gas turbine engine of claim 1, wherein the compliant portion returns fully to the non-deformed shape after cessation of the force.

13. An axial retainer for a gas turbine engine for retaining a composite airfoil at a rotor, the axial retainer comprising:

a compliant portion configured to deform between a deformed shape and a non-deformed shape, wherein the compliant portion is exposed such that it can directly abut the composite airfoil;

at least one void provided in the compliant portion; and wherein the axial retainer is made from a compliant material that deforms from the non-deformed shape to the deformed shape in response to a force acting on the axial retainer, and wherein the axial retainer returns at least partially to its non-deformed shape after cessation of the force, resultant of the complaint material.

14. The axial retainer of claim 13, wherein the at least one void is compressible to permit the compliant portion to deform to the deformed shape.

15. The axial retainer of claim 13, wherein the at least one void is defined by a set of orifices within the compliant portion.

16. The axial retainer of claim 15, wherein the set of orifices are provided as a set of elongated orifices.

17. The axial retainer of claim 13, wherein the at least one void is defined by a porous material for the compliant portion.

18. The axial retainer of claim 13, wherein the at least one void is defined by a lattice structure having one or more spaces, and the one or more spaces defines the at least one void.

19. The axial retainer of claim 13, wherein the at least one void is defined within a bladder.

20. The axial retainer of claim 13, wherein the compliant portion is made of a polymer.

* * * * *